United States Patent
Karaa et al.

(10) Patent No.: US 9,361,083 B2
(45) Date of Patent: Jun. 7, 2016

(54) ENTERPRISE MANAGEMENT FOR DEVICES

(71) Applicant: Microsoft Technology Licensing, LLC, Redmond, WA (US)

(72) Inventors: Hassen Karaa, Bellevue, WA (US); Michael Healy, Duvall, WA (US); Brett D. A. Flegg, Redmond, WA (US); Gaurav Dhawan, Seattle, WA (US); Jeffrey Sutherland, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/787,390

(22) Filed: Mar. 6, 2013

(65) Prior Publication Data

US 2014/0259007 A1  Sep. 11, 2014

(51) Int. Cl.
*G06F 9/445* (2006.01)

(52) U.S. Cl.
CPC .... *G06F 8/61* (2013.01); *G06F 8/62* (2013.01)

(58) Field of Classification Search
CPC ....... G06F 8/61; G06F 17/30117; G06F 8/62; G06F 17/30035; G06F 21/10; G06F 21/121
See application file for complete search history.

(56) References Cited

U.S. PATENT DOCUMENTS

| | | | |
|---|---|---|---|
| 7,289,788 B2 | 10/2007 | Shan | |
| 7,409,208 B1 | 8/2008 | Clare et al. | |
| 7,865,938 B2 | 1/2011 | Shahbazi | |
| 7,970,386 B2 | 6/2011 | Bhat et al. | |
| 8,229,858 B1 | 7/2012 | Mazza et al. | |
| 8,239,918 B1 * | 8/2012 | Cohen | G06F 21/12 726/1 |
| 8,285,578 B2 | 10/2012 | Sheppard | |
| 8,595,489 B1 * | 11/2013 | Faaborg et al. | 713/166 |
| 8,707,385 B2 * | 4/2014 | Jain | G06F 21/577 705/38 |
| 2002/0129356 A1 * | 9/2002 | Hellerstein | G06F 8/61 717/177 |
| 2004/0103214 A1 | 5/2004 | Adwankar et al. | |
| 2004/0111643 A1 | 6/2004 | Farmer | |
| 2008/0141242 A1 * | 6/2008 | Shapiro | G06F 8/61 717/174 |

(Continued)

FOREIGN PATENT DOCUMENTS

WO    WO 2004003708    1/2004

OTHER PUBLICATIONS

David Barrera et al.; Understanding and Improving App Installation Security Mechanisms through Empirical Analysis of Android; 2012 ACM; pp. 81-92; <http://dl.acm.org/citation.cfm?id=2381949>.*

(Continued)

*Primary Examiner* — Thuy Dao
*Assistant Examiner* — Cuong V Luu
(74) *Attorney, Agent, or Firm* — Kate Drakos; Sade Fashokun; Micky Minhas

(57) ABSTRACT

Installing apps on a device. The device is generally configured to be used in a closed market environment that only allows generally available apps of the closed market to be installed. The method includes determining that the device has been authorized to install apps outside of a set of apps generally available from the closed market and from a set of apps available only to users of a particular enterprise. The method further includes determining that an app, that is not generally available from the closed market, has been verified by a central authority. The method further includes installing the app on the device in spite of the fact that the device is generally configured to be used in a closed market environment.

20 Claims, 5 Drawing Sheets

(56) References Cited

U.S. PATENT DOCUMENTS

| | | | |
|---|---|---|---|
| 2010/0031249 A1* | 2/2010 | Baliga | G06Q 10/06 717/174 |
| 2010/0088367 A1 | 4/2010 | Brown et al. | |
| 2010/0088696 A1* | 4/2010 | Stoev | H04L 67/04 717/178 |
| 2010/0299152 A1 | 11/2010 | Batchu et al. | |
| 2010/0313196 A1 | 12/2010 | De Atley et al. | |
| 2011/0015983 A1* | 1/2011 | Bonnat | 705/14.26 |
| 2011/0167105 A1 | 7/2011 | Ramakrishnan et al. | |
| 2011/0202914 A1* | 8/2011 | Kim | G06F 8/61 717/178 |
| 2011/0252240 A1 | 10/2011 | Freedman et al. | |
| 2012/0032945 A1 | 2/2012 | Dare et al. | |
| 2012/0084184 A1 | 4/2012 | Raleigh et al. | |
| 2012/0129503 A1 | 5/2012 | Lindeman et al. | |
| 2013/0091542 A1* | 4/2013 | Cohen | 726/1 |
| 2014/0007048 A1* | 1/2014 | Qureshi | G06F 21/10 717/110 |
| 2014/0157256 A1 | 6/2014 | Marshall et al. | |

OTHER PUBLICATIONS

David Barrea et al.; Secure Software Installation on Smartphones; 2011 IEEE; pp. 42-48; <https://people.inf.ethz.ch/barrerad/files/spmag11-barrera.pdf>.*

Malcolm Sheppard; Smartphone Apps, Permissions and Privacy; 2013 Office of the privacy Commisioner of Canada; 94 pages; <http://rebootpeterborough.ca/wp-content/uploads/2013/04/Smartphone-Apps-Permissions-and-Privacy-report1.pdf>.*

Samidip Basu; Deployment; 2013 Springer; pp. 445-458; <http://link.springer.com/chapter/10.1007/978-1-4302-5026-5_16>.*

Chulhong Min et al.; PowerForecaster Predicting Smartphone Power Impact of Continuous Sensing Applications at Pre-installation Time; 2015 ACM; pp. 31-44; <http://dl.acm.org/citation.cfm?id=2809728&CFID=749726448&CFTOKEN=91915643>.*

Yury Zhauniarovich et al.; DEMO Enabling Trusted Stores for Android; 2013 ACM; pp. 1345-1347; <http://dl.acm.org/citation.cfm?id=2512496&CFID=749726448&CFTOKEN=91915643>.*

Duckering, Brian, "Symantec Mobile Management Suite: Enabling Mobile Productivity Without Sacrificing Protection", Retrieved on: Nov. 20, 2012, Available at: http://www.symantec.com/connect/blogs/symantec-mobile-management-suite-enabling-mobile-productivity-without-sacrificing-protection.

"Symantec Mobile Management for Configuration Manager", Retrieved on: Nov. 20, 2012, Available at: https://www.symantec.com/mobile-management-configuration-manager.

"Zenprise MobileManager", Retrieved on: Nov. 20, 2012, Available at: http://www.zenprise.com/products/zenprise-mobilemanager.

"Cloud-based Enterprise MDM", Retrieved on: Nov. 20, 2012, Available at: http://www.mformation.com/enterprise-solutions/cloud-based-enterprise-mdm.

"An IT Manager's Guide to Managing Personal Devices in the Enterprise", Retrieved on: Nov. 20, 2012, Available at: http://www.sybase.in/files/White_Papers/IT-Mangers-Guide-WP.pdf.

"Understanding Mobile Device Management", Retrieved on: Nov. 20, 2012, Available at: http://technet.microsoft.com/en-us/library/ff959225.aspx.

"How to Add and Remove Apps," Published on: Feb. 29, 2012, Available at: http://technet.microsoft.com/en-us/library/hh852635.aspx#SideloadingRequirements.

"Add Computers, Users, and Moblie Devices to Windows Intune," Retrieved on: Dec. 26, 2012, Available at: http://technet.microsoft.com/en-us/library/hhhh441723.

"The Enterprise Sideloading Story on Windows 8? its Complicated", Retrieved on: Dec. 26, 2012, Available at: http://www.zdnet.com/the-enterprise-sideloading-story-on-windows-8-its-complicated-7000006742/.

"When Mobile Device Management Isn't Enough," Retrieved on: Dec. 27, 2012, Available at: http://interaction.nl.scc.com/www/downlad/Data%20Loss%20Prevention%20Whitepaper.pdf.

"Deploying iPhone and iPad Mobile Device Management," Retrieved on: Dec. 27, 2012, Available at: http://images.apple.com/ipad/business/docs/iOS_MDM_Mar12.pdf.

"SysAid MDM User Guide for Android," Retrieved on: Dec. 28, 2012, Available at: http://www.sysaid.com/betahelp/MDM_Android_Guide_files/MDM_Android_Guide.pdf.

"Mobile Device Management (MDM)", Retrieved on: Dec. 27, 2012, http://utahta.wikispaces.net/file/view/Product+Description+Mobile+Device+Management+Services.pdf.

"Unenrolling iOS Devices," Retrieved on: Dec. 28, 2012, Available at: http://robotcloud.screenstepslive.com/s/2459/m/8435/l/79402-unenrolling-ios-devices.

"Mobile Device Management in iOS," Retrieved on: Aug. 15, 2012, Available at: http://www.apple.com/iphone/business/it-center/deployment-mdm.html.

Bush: "Managing "BYO" PCs in the Enterprise," Published Aug. 16, 2012, Available at: http://blogs.msdn.com/b/ukfe/archive/2012/08/16/managing-quot-byo. . . .

U.S. Appl. No. 13/787,420, filed Mar. 6, 2013, Karaa et al.

International Search Report & Written Opinion for PCT Patent Application No. PCT/US2014/019793, Mailed Date: Jun. 4, 2014, Filed Date: Mar. 3, 2014, 9 pages.

Office Action dated Jul. 1, 2014 cited in U.S. Appl. No. 13/787,420.

Meurer, et al., "APEFS: An Infrastructure for Permission-Based Filtering of Android Apps." Security and Privacy in Mobile Information and Communication Systems. Springer Berlin Heidelberg, Oct. 2012, pp. 1-11.

Office Action dated Nov. 28, 2014 cited in U.S. Appl. No. 13/787,420.

Office Action dated May 21, 2015 cited in U.S. Appl. No. 13/787,420.

Notice of Allowance dated Sep. 14, 2015 cited in U.S. Appl. No. 13/787,420.

* cited by examiner

ENTERPRISE MANAGEMENT FOR DEVICES

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Current networks have allowed many new and different types of devices to be networked. One of the major trends in IT in recent years has been the drive towards "consumerization of IT," which is a term describing how consumer technology, from phones to PCs, is bleeding into business organizations in all forms and fashions. And increasingly, the devices that are showing up are owned by, and liable to the employee rather than the organization for which they work. This is seen most notably in the smartphone device category, but more recently also in tablets or other portable device form factors that are increasingly showing up in the workplace. As organizations embrace consumerization, IT must consider how much control they exert over a user's device, whether personally owned or owned by the enterprise, and how much management of the device is "good enough."

The device may be stolen or the device may host a mobile application that turns out to be Trojan horses that collects saved passwords or log keystrokes and other data. Thus, there may be a desire to control what data and applications can be stored on the device. However, as they may be used for personal purposes, and not just enterprise purposes, there may also be some desire on the user's part to have personal data and applications not under enterprise control. Previous solutions are either too heavy handed with management and take complete control over users' devices or are too light on management and security allowing near unfettered access by a user of enterprise resources using their devices.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method of installing apps on a device. The device is generally configured to be used in a closed market environment that only allows generally available apps of the closed market to be installed. The method includes determining that the device has been authorized to install apps outside of a set of apps generally available from the closed market and from a set of apps available only to users of a particular enterprise. The method further includes determining that an app, that is not generally available from the closed market, has been verified by a central authority. The method further includes installing the app on the device in spite of the fact that the device is generally configured to be used in a closed market environment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments described herein include functionality for managing devices that are used in an enterprise environment. In particular, a device may be used by a user for personal purposes and not just enterprise purposes, but may still be able to be used in the enterprise environment with appropriate control on the device. In particular, the enterprise may exert control over certain aspects of the device, while allowing the user to control other aspects of the device without enterprise interference or intrusion. This management approach balances meeting the security needs of the enterprise while maintaining the user's control over the device and minimizing any impact of the device performance. Embodiments address how to deliver configuration and software that users need in the enterprise context, like applications and data-access on any device, with enough IT control to assert that the device is trustworthy, while avoiding compromising the user's privacy on their own device.

Various embodiments may exhibit various aspects. For example, embodiments may implement an enrollment experience where a user can go through a built in OS component to connect to the enterprise work environment. Alternatively or additionally, embodiments may exhibit a collection of limited amount of inventory that is enough to assess the device's security but not enough to take control of the device and intrude on the user's privacy. Alternatively or additionally, embodiments may exhibit performance aware on demand application distribution where a notification service is used to initiate the installation of applications. Alternatively or additionally, embodiments may exhibit disconnecting from an enterprise that blocks all the applications and/or resets settings obtained from the enterprise.

Enterprise Management for Devices

With more and more people providing their own hardware for work, the "bring your own device" (BYOD) is becoming more commonplace and IT Pros want to have the confidence that they can support their clients who follow this trend. The presence of BYOD does not change the need for IT Pros to manage, secure, and remain accountable for the network assets of an organization. Written policies are often ineffective at enforcing enterprise policies.

Embodiments may include functionality for managing personally managed devices in an enterprise by delivering the settings and software that users need, like applications and data-access on any device, with enough IT control to assert that the device is trustworthy, while avoiding any compromise of the user's privacy on their device.

Figure 1:
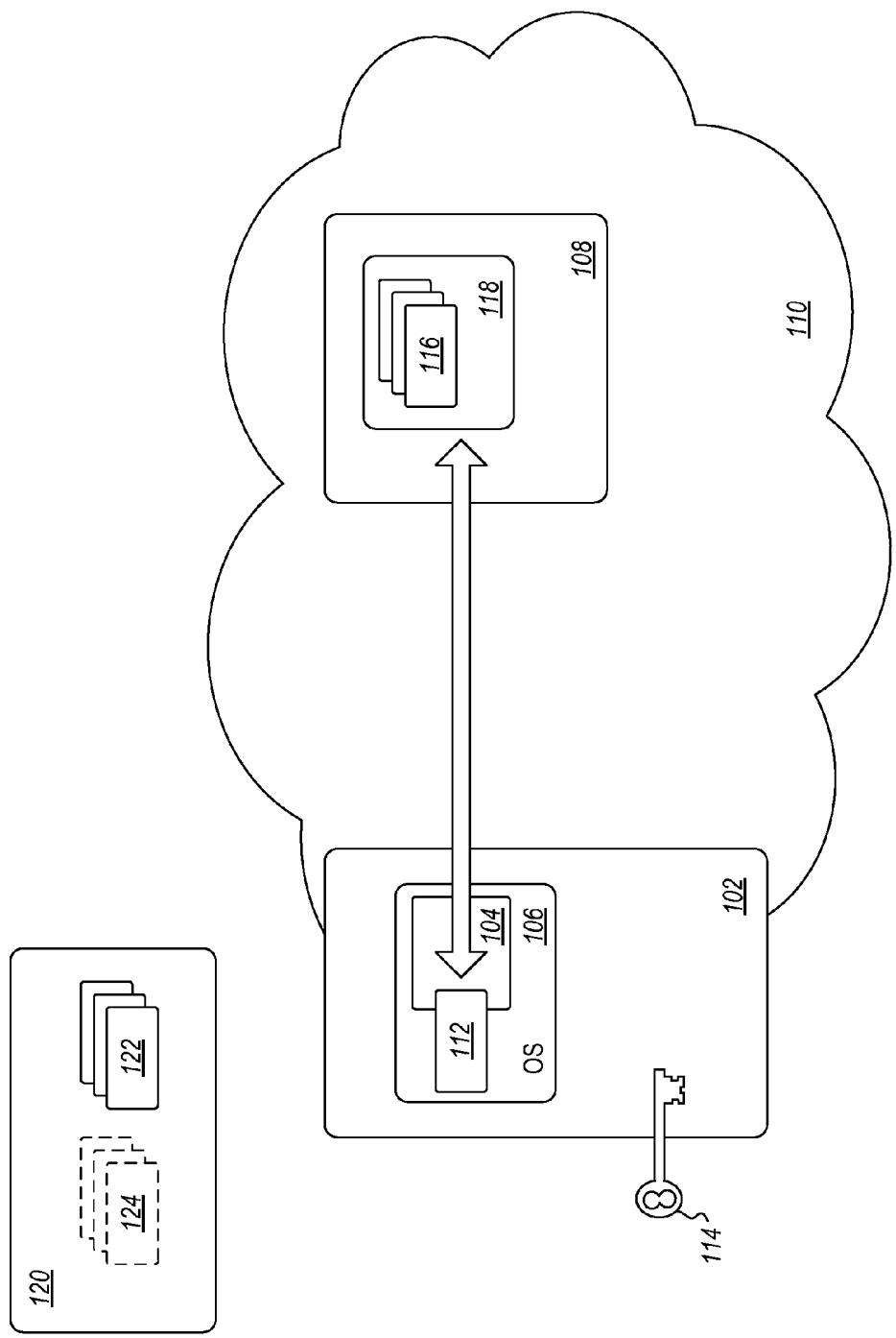
FIG. 1 illustrates an environment including an enterprise network and a device connected to the enterprise network.

Referring now to FIG. 1, a device 102 is illustrated. The device 102 may be a computing device such as a cell phone, pda, tablet, laptop, or other device that a user may choose to connect to an enterprise environment network 110. Some embodiments integrate a light management component (agent 104) built into the device's operating system 106 that can communicate with a management infrastructure 108 in the enterprise network 110 to deliver line of business (LOB) applications (sometimes referred to colloquially and herein as apps) to users.

The management solution has two client installed portions: the system management component, which may be referred to herein as an agent 104; and a user interface, which may be referred to as the self-service portal, or SSP 112, that the device user uses to browse for and install LOB apps made available to them. The SSP 112 may be implemented in a number of different ways, such as an app on the device 102, a web page/service that runs in the user's browser on the device 102, or other interface. Notably, a request to install an app for the user of the device 102 does not need to originate from the device 102 itself. In some embodiments, it may be done from another machine. In the illustrated example, however, both portions of the management solution installed at the client may be designed to be well behaved citizens of the operating system 106 in terms of user experience, power management/battery life, network awareness (for metered networks), and overall functionality.

The agent 104 does most of the heavy lifting on the client device 102. It configures the client device 102 to communicate with the organization's management infrastructure 108; periodically, or by some trigger of the management infrastructure 108, synchronizes with the management infrastructure 108 to check for any updated LOB apps and apply the latest settings policies configured by IT for the device 102; and handles the actual download and installation of any LOB apps that the user wants to install. Finally, if the user or the administrator chooses to remove the device 102 from the management infrastructure 108, it clears the configuration of the agent 104 itself and disables, or securely erases, any LOB apps the user installed from the SSP 112.

Figure 2:
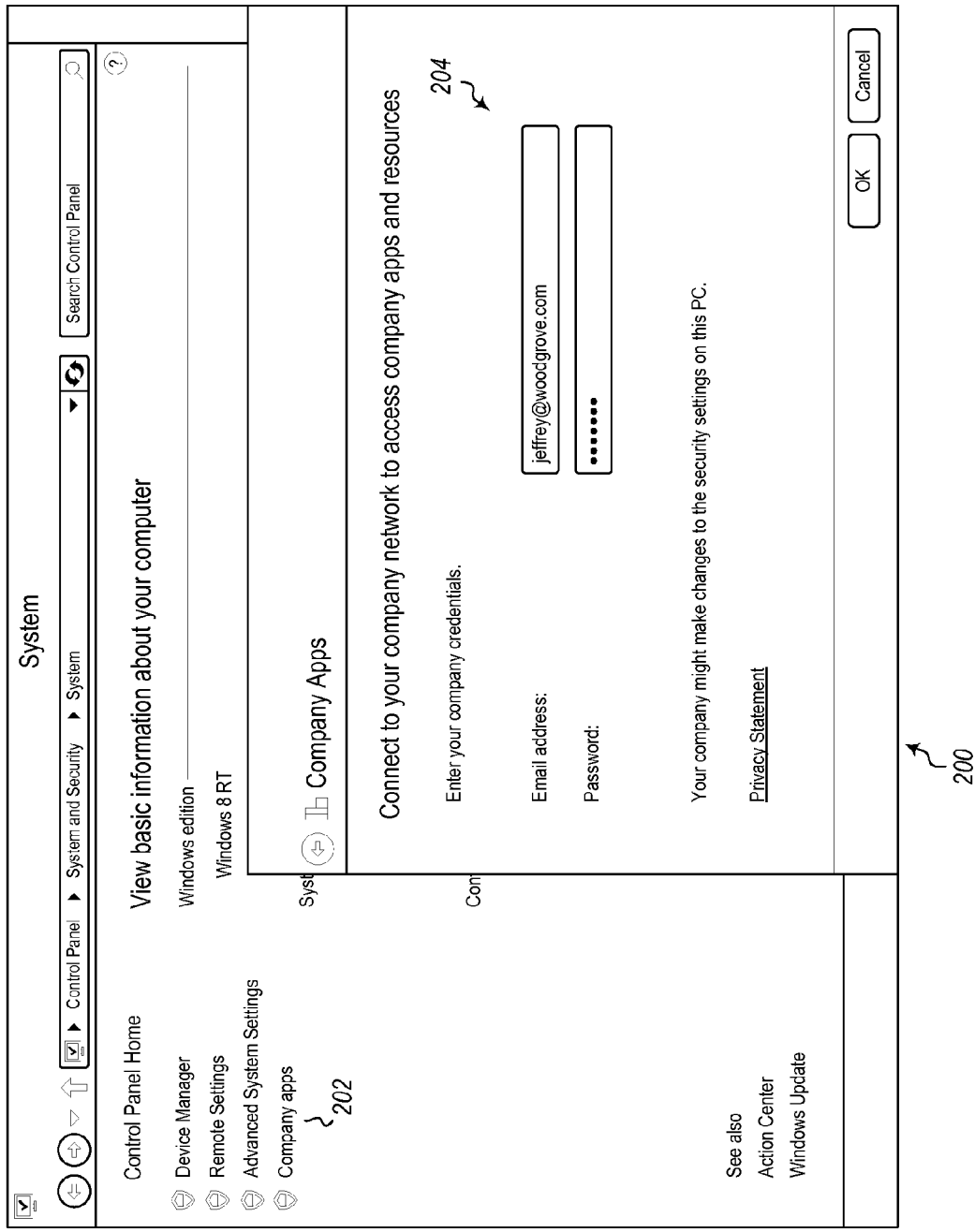
FIG. 2 illustrates a user interface for authenticating a user to an enterprise network.

The following now illustrates additional details regarding connecting the client device 102 to the management infrastructure 108. In some embodiments, connecting a client device 102 to the management infrastructure 108 begins with an IT administrator specifying the group of users, such for example a group of Active Directory® (AD) (available from Microsoft® Corporation of Redmond Wash.) domain users who are authorized to connect devices 108 into the network enterprise 110. The administrator also has the option to specify the maximum number of devices allowed per user or other constraints related to per user enrollment policy. For example, other per user enrollment policy considerations may specify that a user can only enroll when on a particular network, with multi-factor authentication, within a given time period, etc. As illustrated in FIG. 2, an authorized user selects a company apps link 202 of a user interface 200 and supplies their enterprise credentials 204. The agent 104 then performs a service lookup to locate the organization's management infrastructure 108.

Once the agent 104 has found the right address, it establishes a secure connection to the management infrastructure 108 and authenticates the user. If the user is successfully authenticated and has been authorized by the administrator to connect devices (e.g. device 102), the enterprise network 110 issues the right commands to configure the agent 104 for its ongoing communications with the management infrastructure 108. Once complete, the user is directed to install the SSP 112 while the agent 104 completes the connection in the background. Alternatively, the SSP 112 could be installed automatically by the management infrastructure at enrollment time. While in the example illustrated, a user has been authenticated to the management infrastructure 108, in alternative or additional embodiments, the device itself may be authenticated to the management infrastructure. For example, the device 102 could be redirected to a management service which would allow the device to be enrolled on the company's behalf.

Next, the agent 104 automatically initiates a session with the management infrastructure 108, using the settings that it already obtained. This session and any subsequent sessions may performed over a secure connection. This initial session completes the registration of the device 102 with the enterprise network 110 by supplying some basic device information such as the manufacturer and model of the device 102, the operating system version of the device 102, device capabilities, and other hardware information for the device 102. This allows IT administrators to monitor what types of devices are connecting to the organization, so they can improve the apps and services they deliver to users over time.

Following the initial session, the agent 104 initiates communication with the management infrastructure 108 in two circumstances:

First, as a maintenance task that runs on a preset schedule, or from management infrastructure triggers or other triggers, that does not impact the user experience. The activities performed during these maintenance sessions focus on reporting updated hardware information to the management infrastructure 108, applying changes to the settings policies for the device 102, reporting compliance back to the management infrastructure 108, and applying app updates to LOB apps, or retrying any previously failed LOB app installations initiated from the SSP 112.

Secondly, the agent 104 will communicate with the management infrastructure 108 anytime the user initiates an app installation from the SSP 112. In some embodiments, these user-initiated sessions are solely focused on app installation and do not perform the maintenance and management activities described in the first case.

Regardless of whether a session is initiated automatically by a scheduled maintenance task or manually by the user, the client 102 device continues to behave well relative to the state of the battery on the device and its current network conditions.

Settings Policy Management

As already discussed, access to LOB apps typically requires systems to comply with basic security and data protection policies. From the management infrastructure 108, the IT administrator is able to configure a set of policies that they believe are important to give IT the assurances they need without seriously affecting the user's experience with their device. In particular, administrators can enforce, password policies and turning off certain peripherals.

In addition to the configurable policies described above, the agent 104 can also be used to automatically configure other settings such as network settings, VPN configuration, WiFi settings, etc., so that the managed device 102 can easily connect to an enterprise network 110. Finally, the agent 104 can also monitor and report on compliance of the device 102 with a set of policies Leveraging this compliance information, IT administrators can more effectively control access to corporate resources on the enterprise network 110 if a device is determined to be at risk. Yet once again, the user's basic experience with the device is left intact and their personal privacy is maintained.

LOB App Management

The previous discussion has been focused on the mechanics of the client device 102 and management infrastructure 108 along with the needs of the IT administrator. However, an important aspect of the above is the benefit that can be provided to the end user by enabling access to their LOB apps.

There are several different categories and types of apps that IT can publish for users in the SSP 112. For example, IT can publish: internally developed apps developed by the enterprise; apps produced by independent software vendors that are licensed to the organization for internal distribution; web links that launch websites and web-based apps directly in the browser; links to app listings in other application stores (this is a convenient way for IT to make users aware of useful business apps that are publicly available); etc.

Figure 3:
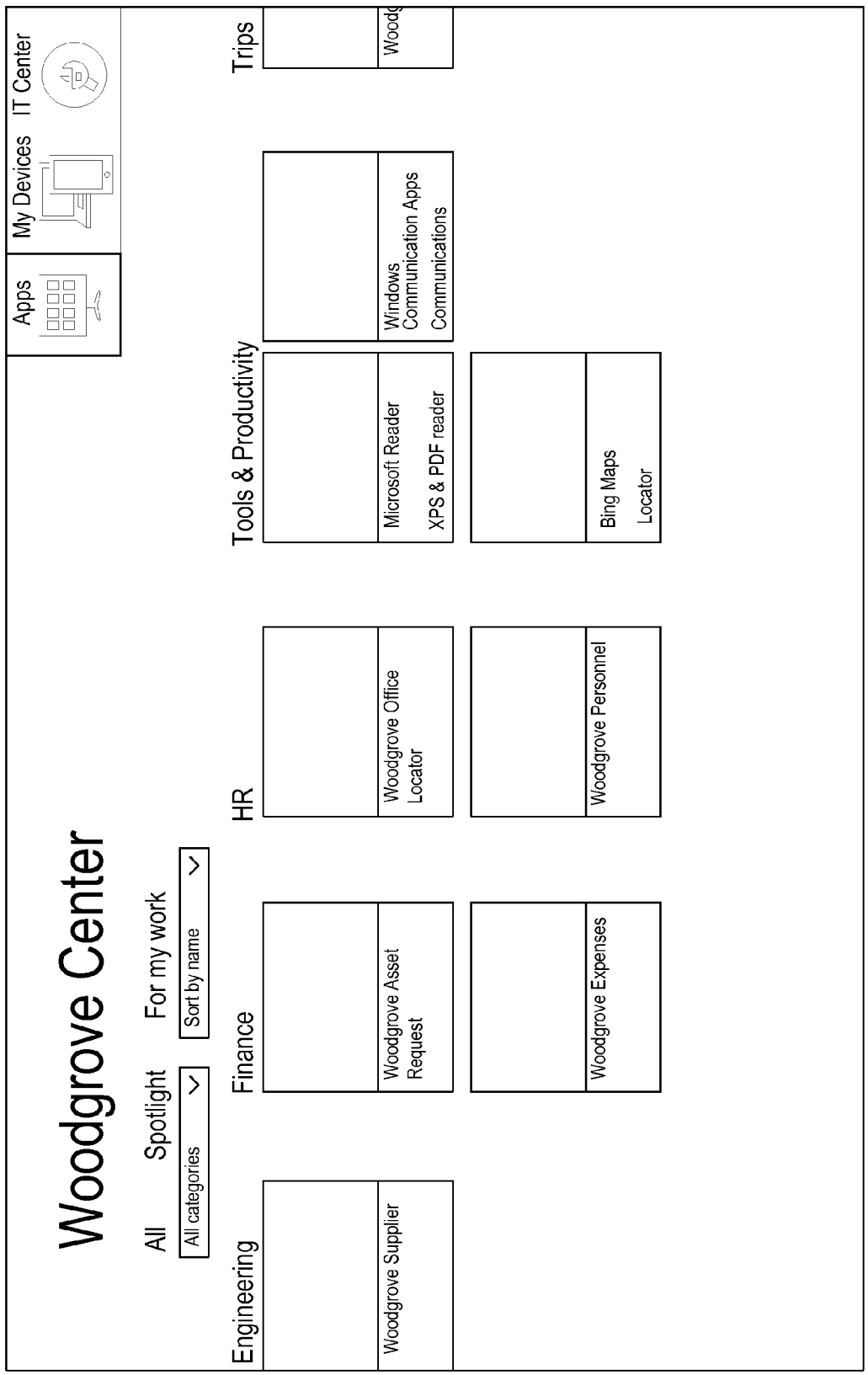
FIG. 3 illustrates a user interface for a user to select enterprise apps for installation on a device.

Because the user specified his or her corporate credentials as part of the initial connection with the management infrastructure 108, as illustrated in FIG. 2, the IT administrator can then specify which apps are published to each user individually. As a result, the user only sees those apps that are applicable to them in the SSP 112. FIG. 3 illustrates an example of the SSP 112 user experience for a user browsing for LOB apps in the SSP 112 for a fictional enterprise called "Woodgrove."

Notably, embodiments may be implemented in a closed app market environment. In such an environment, the typical user scenario is that users are only allowed to install apps from a pre-approved set of available apps from an authorized market. For example, using the Windows Phone™ available from Microsoft® Corporation of Redmond Wash., a user is typically only able to install apps from the Microsoft® official application marketplace which offers apps that have been evaluated and pre-approved for offering in the official application marketplace. In other embodiments, the closed app market environment may be closed as to certain types of apps, but open to other types of applications. For example, using Windows 8 available from Microsoft Corporation of Redmond Wash., a user is able to only install Windows Store Apps from the official application marketplace in the Windows 8 interface (such as that illustrated in FIG. 3), while other applications can be installed in the desktop interface with little or no restriction.

Embodiments may be extended to allow apps that are of a style or format to be typically offered in a closed app market environment, but that are not generally offered in the closed app market environment to nonetheless be "side-loaded" so as to allow enterprise specific apps, not offered in the closed market, to nonetheless be installed on the device 102. For example, a Windows® Phone would be able to install apps not offered in the official application marketplace. Alternatively, a Windows® 8 device would be able to install Windows Store Apps not available in the official application marketplace.

In some embodiments, this, or enabling certain settings or management functions, may be accomplished by installation of a side loading key 114 on the device 102 which, so long as the side loading key 114 is valid, allows the device 102 to side load apps 116 from a content server 118 of the management infrastructure, where the apps 116 are not offered generally in the closed app market 120, such as the apps 122.

However, while the apps 116 that can be installed using the side loading key 14 are not generally offered in the closed app market 120, in some embodiments, the apps 116 must still be validated and authorized to be installed on the device by a central authority. For example, the same central authority that validates and authorizes apps provided in the closed app market 120 may validate and authorize the apps intended to be side loaded onto the device 102, so long as the device 102 has a valid side loading key 114 (or other indication that the device is authorized to side load apps).

The side loading key 114 can be obtained in a number of different ways. For example, in some embodiments, the side loading key 114 may be purchased from the closed app market 120. In other embodiments, the key may be purchased by the enterprise from a central authority. In some embodiments, a single side loading key 114 may be valid for a particular number of installs onto devices. For example, the side loading key may be able to be installed on multiple different devices at any given time.

Figure 4:
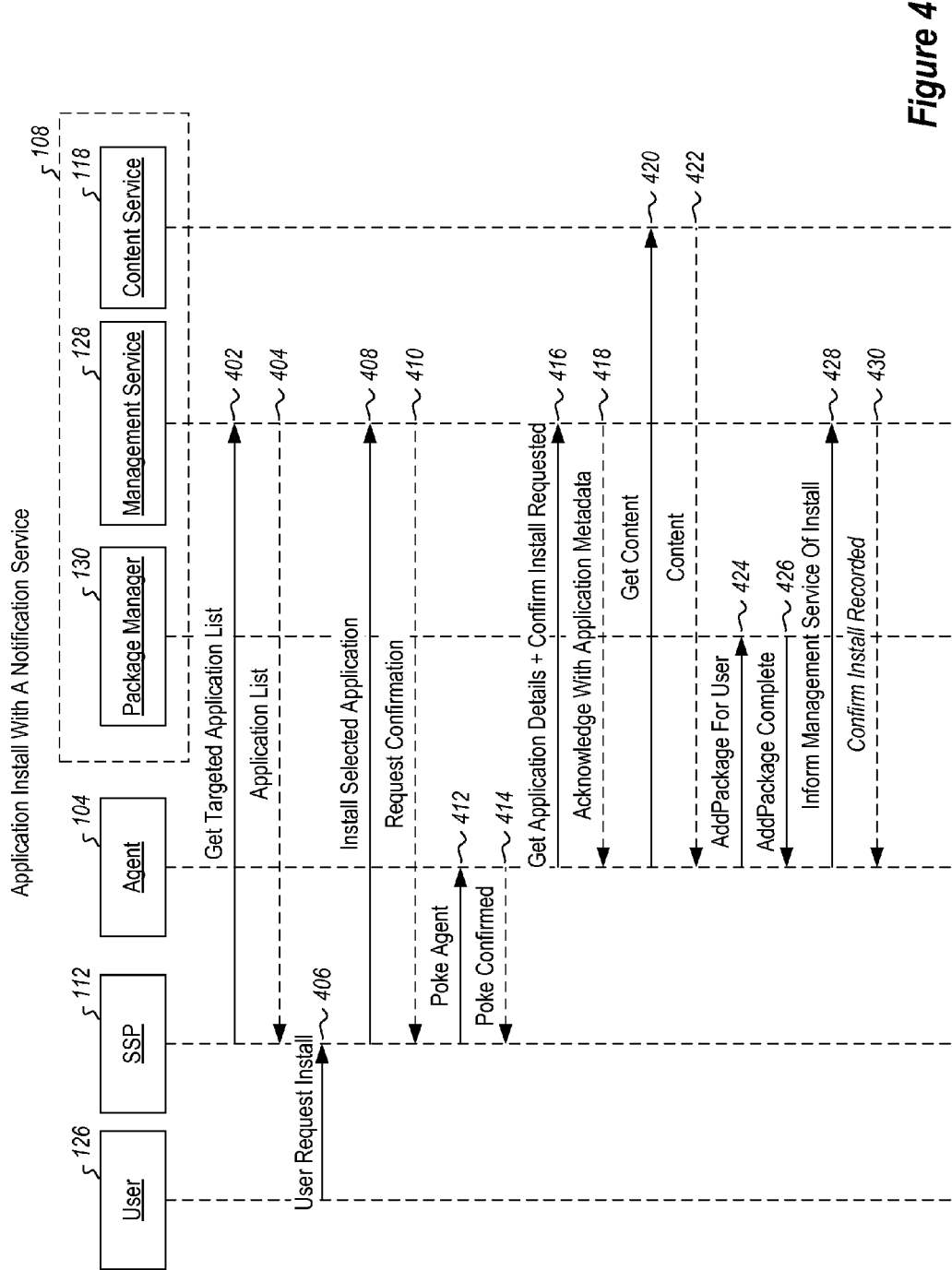
FIG. 4 illustrates a message flow for installing enterprise apps on a device.

In some embodiments, when the user chooses to install an app from the SSP 112, the request is sent to the management infrastructure 108 and a download link is provided to the agent 104. The agent 104 then downloads the app, verifies the validity of the content, checks the signature, and installs the app. All of this typically occurs within seconds and is generally invisible to the user. In the event that an error occurs during any part of this process (e.g. the location of the content is unavailable), the agent 104 queues the app for a retry during its next regularly scheduled maintenance session. In either case, the agent 104 reports the state of the installation back to the management infrastructure 108. FIG. 4 details this interaction.

In particular, FIG. 4 illustrates at 402 that the SSP 112 obtains a targeted application list from a management service 128 at the management infrastructure 108. The management service 128, as illustrated at 404, at the management infrastructure 108 sends back an application list to the SSP 112 where the application list includes an enumeration of applications available to be installed by the device 102. As illustrated at 406, the user 126 interacts with the SSP 112 and requests installation of an application. As illustrated at 408, the SSP 112 requests that the user requested application be installed by the management service 128. As illustrated at 410, the management service 128 confirms the request. As illustrated at 412, the SSP 112 pokes the agent 104 indicating to the agent that the application selected by the user 126 should be installed. As illustrated at 414, the agent 104 confirms the poke to the SSP 112. As illustrated at 416, the agent 104 requests application details and confirms the installation request by the user 126 to the management service 128. As illustrated at 418, the management service acknowledges the application requests to the agent 104. As illustrated at 420, the agent 104 requests application content from the content service 118 in the management infrastructure 108. As illustrated at 422, the content service 118 returns the application content to the agent 104 at the device 102. As illustrated at 424, the agent 104 communicates with a package manager 130 at the device 102 indicating that the application should be added for the user 126. As illustrated at 426, the package manager 130 indicates that installation of the application is complete. As illustrated than 428, the agent 104 informs the management service 128 that the application has been installed. As illustrated at 430, the management service 128 confirms to the agent 104 that the installation of the user selected application has been recorded.

In some alternative embodiments, the closed app market 120 itself may have certain app offerings available that are only available to devices with a side loading key installed on the device 102. For example, the closed app market 120 could provide one set of apps 122 generally to devices, but provide additional apps 124 for installation to devices based on side loading keys installed on the devices. The additional apps available for installation may be dependent on what side loading key is installed on the device. Thus, the closed app market 120 could maintain a set of apps, on behalf of the enterprise, for installation on enterprise authorized devices.

As part of its regular maintenance sessions, the agent 104 will inventory which LOB apps are currently installed and report that information back to the management infrastructure 108 so the IT administrator can effectively manage their LOB apps. In some embodiments, only apps that were installed via the SSP 112 and the client device 102 are included in this inventory from a device. In some embodiments, generally available apps installed from a closed app market are not reported as part of the inventory. In some embodiments, the agent 104 may be restricted to only be able to inventory enterprise apps 116 and is not able to inventory apps 122 on the device 102 that the user has installed for personal use.

Anytime the IT administrator publishes an update for an app that has been installed on an enterprise authorized device 102, the agent 104 will automatically download and install the update during its next regular maintenance session. Alternatively, during a regular maintenance window the management infrastructure 108 may detect that an update is available and applicable, and as a result, notify the user Disconnecting from the Management Infrastructure 108

Details are now illustrated on how to disconnect a device from the management infrastructure 108. Disconnecting may be initiated either locally by the user or remotely by the user or the IT administrator. Users may choose to disconnect for any number of reasons, including leaving the enterprise or getting a new device and no longer needing access to their LOB apps on the old device. Administrators may choose to disconnect a user's device after they have left the enterprise or because the device is regularly failing to comply with the organization's security settings policy. In another alternative embodiment, the enterprise may automatically disconnect a user device 102 if the device has not connected to the enterprise network 110 for a given period of time.

During disconnection, the agent 104 performs a number of actions (and/or ceases performing a number of actions). For example, the agent 104 removes access to all the applications that the user obtained from the enterprise. In some embodiments, the agent 104 can block access to the applications 116 or can completely remove the applications 116 from the device 102. The agent 104 ceases enforcement of the settings policies that the management infrastructure 108 has applied. The agent 104 reports successful deactivation to the management infrastructure 108 if the administrator initiated the process. The agent 104 removes the agent 104 configuration, including the scheduled maintenance task. Once completed, the agent 104 remains dormant unless the user reconnects it to the management infrastructure 108 or another management infrastructure.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
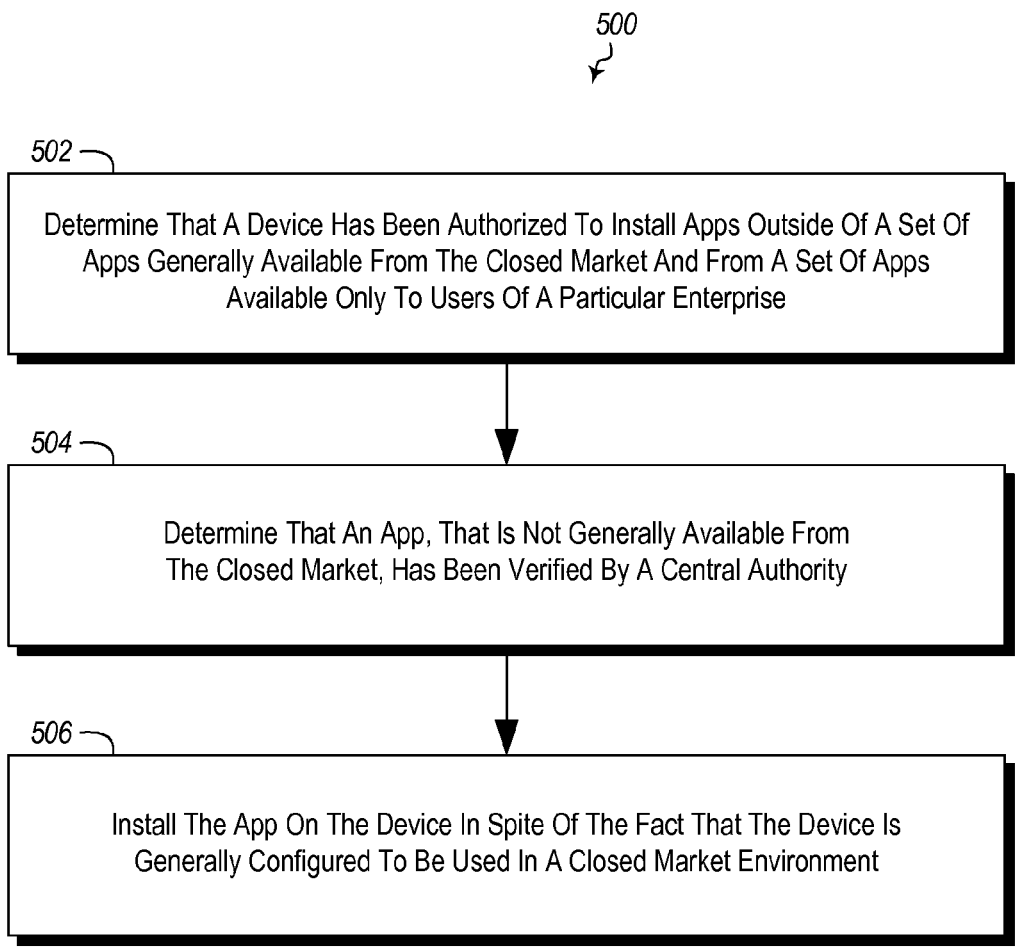
FIG. 5 illustrates a method of installing apps on a device.

Referring now to FIG. 5, a method 500 is illustrated. The method 500 includes acts for installing apps on a device. The device is generally configured to be used in a closed market environment that only allows generally available apps of the closed market to be installed. The method 500 includes determining that the device has been authorized to install apps outside of a set of apps generally available from the closed market and from a set of apps available only to users of a particular enterprise (act 502). For example, the method 500 may be performed where determining that the device has been authorized to install apps outside of a set of apps generally available from the closed market comprises determining that a side loading key has been installed on the device. Such an example is illustrated in FIG. 1 by using the side loading key 114 with the device 102.

The method 500 further includes determining that an app, that is not generally available from the closed market, has been verified by a central authority (act 504). The method 500 may be practiced where determining that an app that is not generally available from the closed market has been verified by a central authority includes determining that the app has been verified by a central authority responsible for the closed market. For example, as illustrated and FIG. 1, the entity responsible for maintaining the market 120 and verifying the apps 122 may also verify the apps 116 in spite of the fact that the apps 116 are not offered in the market 120. Thus the apps 116 available from the enterprise network 110 nonetheless have an authority chain to a central authority.

The method 500 further includes installing the app on the device in spite of the fact that the device is generally configured to be used in a closed market environment (at 506).

The method 500 may further include providing a user interface to a user to allow a user to select the app from among a set of apps available for devices authorized to connect to the particular enterprise; receiving user input selecting the app; notifying a service that the user has selected the app; receiving a notification from the service that the app is available to be installed; and wherein installing the app on the device is performed in a fashion that minimizes disruption to the device. Examples of this functionality are illustrated in FIGS. 3 and 4. In particular, FIG. 3 illustrates a user interface that may be presented to a user to allow a user to select apps for installation. FIG. 4 illustrates an example of communication between various entities to allow a user to indicate what apps the user would like to install in the process for installing the apps. In some such embodiments, the app may be installed when the device determines that it has sufficient free resources to install the app without serious impact to the user experience of the device.

The method 500 may further include maintaining an enumeration of apps from the set of apps available only to users of a particular enterprise that have been installed on the device. In particular, a manifest may be maintained at the device 102 and the agent 104 that enumerates the various apps that have been installed on the device 102. This can be used to report to an enterprise central authority information about what apps are installed on the device 102.

The method 500 may further include providing a report to an enterprise administrator. The report may include an enumeration of all apps from the set of apps available only to users of a particular enterprise that have been installed on the device without identifying in the report other apps that have been installed on the device. For example, the report may identify any the apps 116 that have been installed on the device 102 but will not identify any apps selected from the set of apps 122 that have been installed on the device 102.

The method 500 further includes various acts for removing the device 102 from the enterprise network 110. For example, the method 500 may include deauthorizing the device such that the device can no longer install apps from among the set of apps available only to users of a particular enterprise; disabling or deleting any apps from among the set of apps available only to users of a particular enterprise that have already been installed on the device; and making data associated with any apps from among the set of apps available only to users of a particular enterprise that have already been installed on the device inaccessible. In some embodiments, this may be performed in response to the device not contacting a management infrastructure for a pre-determined period of time. In alternative or additional embodiments, this may be performed in response to a user indicating a desire to disconnect the device from the enterprise. In yet another additional, or alternative embodiment this may be performed in response to an administrator indicating a desire to disconnect the device from the enterprise.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented at a computing device that includes one or more processors, for configuring the computing device for use with an enterprise management infrastructure, the method comprising:
    connecting the computing device to a management infrastructure of an enterprise, including:
        configuring an agent at the computing device for ongoing communications with a management infrastructure of the enterprise;
        installing an enterprise self-service portal at the computing device; and
        installing a sideloading key of the enterprise on the computing device, which authorizes the computing device to enterprise apps that are not generally offered in a closed app market;
    as part of a periodic computing device-initiated maintenance task of the agent, the agent performing two or more of the following: reporting updated device configuration information to the management infrastructure, applying a policy change configured for the computing device, reporting device compliance information to the management infrastructure, or updating one or more installed enterprise apps; and
    as part of a user-initiated application installation task of the agent that is initiated by a user at the self-service portal, the agent sideloading a particular enterprise app on the computing device, including:
        determining that the computing device possesses the sideloading key and is therefore authorized to install enterprise apps that are not generally offered in a closed app market; and
        based on the computing device possessing the particular sideloading key, obtaining the particular enterprise app from the management infrastructure and installing the particular enterprise app on the computing device.

2. The method of claim 1, further comprising:
    providing a self-service portal user interface to the user to allow the user to select the particular enterprise app from among a set of enterprise apps that are provided by the enterprise;
    receiving user input selecting the particular enterprise app;
    notifying a service that the user has selected the particular enterprise app;
    receiving a notification from the service that the particular enterprise app is available to be installed; and
    wherein installing the particular enterprise app on the computing device is performed in a fashion that minimizes disruption to the computing device.

3. The method of claim 1, wherein the particular enterprise app is installed when the computing device determines that it has sufficient free resources to install the particular enterprise app without serious impact to a user experience of the computing device.

4. The method of claim 1, further comprising:
    maintaining an enumeration of enterprise apps that have been installed on the computing device.

5. The method of claim 1, further comprising:
    providing a report to an enterprise administrator, the report comprising an enumeration of all enterprise apps from the enterprise that have been installed on the computing device, without identifying in the report other non-enterprise apps that have been installed on the computing device.

6. The method of claim 1, further comprising disconnecting the computing device from the management infrastructure, including:
    disabling or deleting any enterprise apps that have already been installed on the computing device; and
    making data associated with any enterprise apps that have already been installed on the computing device inaccessible at the computing device.

7. The method of claim 6, wherein at least a portion of the acts of claim 6 are performed in response to the computing device not contacting the management infrastructure for a pre-determined period of time.

8. The method of claim 6, wherein at least a portion of the acts of claim 6 are performed in response to the user indicating a desire to disconnect the computing device from the management infrastructure.

9. The method of claim 6, wherein at least a portion of the acts of claim 6 are performed in response to an enterprise administrator indicating a desire to disconnect the computing device from the management infrastructure.

10. The method of claim 1, wherein the particular sideloading key is issued by a central authority corresponding to the closed app market.

11. A computing device, comprising:
    one or more processors; and
    one or more computer readable media, wherein the one or more computer readable media comprise computer executable instructions that, when executed by the one or more of the processors, configure the computing device to perform at least the following:
        connect the computing device to a management infrastructure of an enterprise, including:
            configuring an agent at the computing device for ongoing communications with a management infrastructure of the enterprise;
            installing an enterprise self-service portal at the computing device; and
            installing a sideloading key of the enterprise on the computing device, which authorizes the computing device to install apps that are not generally offered in a closed app market;
        perform two or more of the following as part of a periodic computing device-initiated maintenance task of the agent: report updated device configuration information to the management infrastructure, apply a policy change configured for the computing device, report device compliance information to the management infrastructure, and update one or more installed enterprise apps; and
        sideload a particular enterprise app on the computing device as part of a user-initiated application installation task of the agent that is initiated by a user at the self-service portal, including:
            determining that the computing device possesses the sideloading key and is therefore authorized to install apps that are not generally offered in a closed app market; and
            based on the computing device possessing the particular sideloading key, obtaining the enterprise app from the management infrastructure and installing the enterprise app on the computing device.

12. The computing device of claim 11, further comprising computer executable instructions that configure the computing device to perform the following:

provide a self-service portal user interface to the user to allow the user to select the particular enterprise app from among a set of enterprise apps that are provided by the enterprise;

receive user input selecting the particular enterprise app;

notify a service that the user has selected the particular enterprise app;

receive a notification from the service that the particular enterprise app is available to be installed; and wherein the particular enterprise app is installed on the computing device in a fashion that minimizes disruption to the computing device.

13. The computing device of claim 11, further comprising computer executable instructions that configure the computing device to install the particular enterprise app when the computing device determines that it has sufficient free resources to install the particular enterprise app without serious impact to a user experience of the computing device.

14. The computing device of claim 11, further comprising computer executable instructions that configure the computing device to maintain an enumeration of enterprise apps that have been installed on the computing device.

15. The computing device of claim 11, further comprising computer executable instructions that configure the computing device to provide a report to an enterprise administrator, the report comprising an enumeration of all enterprise apps from the enterprise that have been installed on the computing device, without identifying in the report other non-enterprise apps that have been installed on the computing device.

16. The computing device of claim 11, further comprising computer executable instructions that configure the computing device to perform the following:

disable or delete any enterprise apps that have already been installed on the computing device; and make data associated with any enterprise apps that have already been installed on the computing device inaccessible at the computing device.

17. One or more hardware storage devices having stored thereon computer executable instructions that are executable by one or more processors of a computing device, and that configure the computing device to perform at least the following:

connect the computing device to a management infrastructure of an enterprise, including:

configuring an agent at the computing device for ongoing communications with a management infrastructure of the enterprise;

installing an enterprise self-service portal at the computing device; and installing a sideloading key of the enterprise on the computing device, which authorizes the computing device to install apps that are not generally offered in a closed app market;

perform two or more of the following as part of a periodic computing device-initiated maintenance task of the agent: report updated device configuration information to the management infrastructure, apply a policy change configured for the computing device, report device compliance information to the management infrastructure, and update one or more installed enterprise apps; and sideload a particular enterprise app on the computing device as part of a user-initiated application installation task of the agent that is initiated by a user at the self-service portal, including:

determining that the computing device possesses the sideloading key and is therefore authorized to install apps that are not generally offered in a closed app market; and based on the computing device possessing the particular sideloading key, obtaining the enterprise app from the management infrastructure and installing the enterprise app on the computing device.

18. The one or more hardware storage devices of claim 17, further comprising computer executable instructions that configure the to perform the following:

provide a self-service portal user interface to the user to allow the user to select the particular enterprise app from among a set of enterprise apps that are provided by the enterprise;

receive user input selecting the particular enterprise app;

notify a service that the user has selected the particular enterprise app;

receive a notification from the service that the particular enterprise app is available to be installed; and wherein the particular enterprise app is installed on the computing device in a fashion that minimizes disruption to the computing device.

19. The one or more hardware storage devices of claim 17, further comprising computer executable instructions that configure the computing device to maintain an enumeration of enterprise apps that have been installed on the computing device.

20. The one or more hardware storage devices of claim 17, further comprising computer executable instructions that configure the computing device to provide a report to an enterprise administrator, the report comprising an enumeration of all enterprise apps from the enterprise that have been installed on the computing device, without identifying in the report other non-enterprise apps that have been installed on the computing device.

* * * * *